United States Patent Office 2,752,384
Patented June 26, 1956

2,752,384

SURFACE ACTIVE POLYETHOXY ETHER ESTERS OF BIS(CHLOROPHENYL) ACETIC ACID

Warren D. Niederhauser, Huntingdon Valley, and Edwin J. Smialkowski, Philadelphia, Pa., assignors to Rohm & Haas Company, Philadelphia, Pa., a corporation of Delaware No Drawing. Application May 5, 1953,
Serial No. 353,245

5 Claims. (Cl. 260—469)

This invention deals with surface active polyether esters of the formula $$(\text{Cl phenyl})_2\text{CHCO}_2(\text{CH}_2\text{CH}_2\text{O})_x\text{R}^\circ$$

wherein $x$ is an integer from 4 to about 20 and $R^\circ$ is a lower alkyl group of not over four carbon atoms.

Reaction of compounds having reactive hydrogen atoms and ethylene oxide is known to lead to polyethoxyethanols which have surface activity provided the said compounds have a hydrocarbon group of sufficient size to provide a hydrophobic group which balances the hydrophilic portion of the molecule. Proposals have also been made to block out the hydroxyl group of the polyethoxyethanols with compensating changes in the ether chain and hydrocarbon group so that proper orientation is retained.

Now quite unexpectedly we have found that a relatively large hydrocarbon group is not essential. Contrary to the usual concepts regarding balance and orientation we have found that a bis(chlorophenyl)methyl group can be used in place of a long-chained hydrocarbon substituent where the bis(chlorophenyl)methyl group occurs in a polyethoxyethyl alkyl ether. We have further found that this group can be so introduced by utilizing an ester grouping. The resulting compounds are characterized by some unusual properties.

Compounds of the formula $$(\text{ClC}_6\text{H}_4)_2\text{CH}-\text{CO}_2(\text{CH}_2\text{CH}_2\text{O})_x\text{R}^\circ$$

can be prepared by reacting an acid of the formula $$(\text{ClC}_6\text{H}_4)_2\text{CH}-\text{COOH}$$

with an ether alcohol of the formula $$\text{HO}(\text{CH}_2\text{CH}_2\text{O})_x\text{R}^\circ$$

where $R^\circ$ is methyl, ethyl, propyl, or butyl and $x$ is an integer from 4 to about 20. The acid and alcohol are conveniently reacted together in a volatile, water-immiscible solvent in which forms an azeotrope with water and thus aids in the removal of water of esterification.

As is known bis(chlorophenyl)acetic acid is obtained in 70% to 78% yield by the reaction of alkali on 1,1-bis(chlorophenyl)-2,2,2-trichloroethane, followed by acidification. Methyl and ethyl esters of this acid may also be formed. These may be subjected to an alcoholysis with an alkyl polyethoxyhydroxyethyl ether to give the bis(chlorophenyl)acetates of this invention.

Some typical preparations of these compounds follow. Parts in the following examples are by weight.

Example 1

A mixture of 282 parts of bis(p-chlorophenyl)acetic acid, 473 parts of the monomethyl ether of decaethylene glycol, and 1000 parts of toluene is heated under reflux. The condensate is trapped, water is removed therefrom, and toluene is returned to the reaction mixture. After the reaction is carried on for 13 hours at 122° C., no more water appears. The solvent is distilled to leave a clear, amber oil which is miscible with aromatic solvents and with water. An aqueous 1% solution has a cloud point of 50° C. An aqueous 0.1% solution has a surface tension of 38.5 dynes/cm. Yet it is as efficient in the Fineman hard surface detergency test as the commercial non-ionic detergents heretofore available.

A particular feature of this compound is the practical absence of foam on its aqueous solutions. In the Ross-Miles foam test a 1% solution gives an initial foam height of 2 mm. A 0.1% solution gives an initial foam height of 0 mm. In contrast a 1% solution of the octylphenoxypolyethoxyethanol widely used as a detergent gives an initial foam height of 240 mm., while a 0.1% solution of this same material gives an initial foam height of 160 mm. The detergent action of the compound prepared above coupled with its almost negligible capacity for producing foam renders it peculiarly useful in applications where foam is objectionable, as in mechanical dishwashers, metal cleaning and dairy pipe line cleaning.

The compound prepared above has the formula $$(p\text{-ClC}_6\text{H}_4)_2\text{CH}-\text{COO}(\text{CH}_2\text{CH}_2\text{O})_{10}\text{CH}_3$$

Example 2

In the same way there are reacted 56.4 parts of bis(chlorophenyl)acetic acid (the chlorine being para and ortho) and 147 parts of the monobutyl ether of a polyethylene glycol having 15 ethylene groups. The product is obtained as a yellow, oily liquid which is soluble both in organic solvents, such as toluene, and in water. It has the structure $$(\text{ClC}_6\text{H}_4)_2\text{CH}-\text{CO}_2(\text{CH}_2\text{CH}_2\text{O})_{15}\text{C}_4\text{H}_9$$

This compound when formulated at 5% in sodium tripolyphosphate gives hard surface detergency values on glass of about 90% without redeposition of soil. It gives very little foam.

Repetition of the above preparation with the methyl ether, $\text{HO}(\text{CH}_2\text{CH}_2\text{O})_{15}\text{CH}_3$, gives a similar product which is soluble in water and which is surface active. The solutions thereof are unusually low in foam. This product has the structure $$(\text{ClC}_6\text{H}_4)_2\text{CH}-\text{CO}_2(\text{CH}_2\text{CH}_2\text{O})_{15}\text{CH}_3$$

Example 3

In the same way there are reacted 28.2 parts of bis(chlorophenyl)acetic acid and 25.2 parts of the monoethyl ether of pentaethylene glycol. The product, $$(\text{ClC}_6\text{H}_4)_2\text{CH}-\text{CO}_2(\text{CH}_2\text{CH}_2\text{O})_5\text{CH}_3$$

is soluble in water and is surface active. It is not a foaming agent and, in fact, it can be used at low concentrations to suppress or decrease foam.

Example 4

There are mixed 56.4 parts of bis(chlorophenyl)acetic acid, 82 parts of monomethyl ether of a mixture of polyethylene glycols averaging 8.6 ethylene groups, and 200 parts of toluene. The mixture is heated under reflux with removal of water. When water can no longer be obtained the solvent is distilled off. The residue is stripped under reduced pressure. It corresponds in composition to the compound $$(\text{ClC}_6\text{H}_4)_2\text{CH}-\text{CO}_2(\text{CH}_2\text{CH}_2\text{O})_{8-9}\text{CH}_3$$

It is soluble in water. Its solutions have reduced surface tensions. The compound is an effective detergent on hard surfaces, yet it does not give foam.

We claim:
1. Compounds of the formula

$$(\text{ClC}_6\text{H}_4)_2\text{CHCO}_2(\text{CH}_2\text{CH}_2\text{O})_x\text{R}^\circ$$

where R° is an alkyl group of not over four carbon atoms and $x$ is an integer from 4 to 20.

2. A compound of the formula $$(ClC_6H_4)_2CH-CO_2(CH_2CH_2O)_xCH_3$$

where $x$ is an integer from 4 to 20.

3. A compound of the formula $$(ClC_6H_4)_2CH-CO_2(CH_2CH_2O)_{10}CH_3$$

4. A compound of the formula $$(ClC_6H_4)_2CH-CO_2(CH_2CH_2O)_{15}CH_3$$

5. A compound of the formula $$(ClC_6H_4)_2CHCO_2(CH_2CH_2O)_5CH_3$$

No references cited.